(12) United States Patent
Wu et al.

(10) Patent No.: US 11,521,903 B1
(45) Date of Patent: Dec. 6, 2022

(54) METHOD OF MEASURING VOIDS IN UNDERFILL PACKAGE

(71) Applicant: CORETECH SYSTEM CO., LTD., Zhubei (TW)

(72) Inventors: Chien-Ting Wu, Zhubei (TW); Ching-Kai Chou, Zhubei (TW); Kai-Yi Bai, Zhubei (TW); Wei-Yu Lin, Zhubei (TW); Li-Hsuan Shen, Zhubei (TW); Chia-Peng Sun, Zhubei (TW); Chih-Chung Hsu, Zhubei (TW); Rong-Yeu Chang, Hsinchu (TW); Chia-Hsiang Hsu, Zhubei (TW)

(73) Assignee: CORETECH SYSTEM CO., LTD., Zhubei (TW)

( * ) Notice: Subject to any disclaimer, the term of this patent is extended or adjusted under 35 U.S.C. 154(b) by 0 days.

(21) Appl. No.: 17/564,693

(22) Filed: Dec. 29, 2021

Related U.S. Application Data

(60) Provisional application No. 63/227,101, filed on Jul. 29, 2021.

(51) Int. Cl.
*H01L 21/66* (2006.01)
*H01L 21/56* (2006.01)
*G06F 30/39* (2020.01)
*G06F 113/18* (2020.01)

(52) U.S. Cl.
CPC ............ *H01L 22/12* (2013.01); *G06F 30/39* (2020.01); *H01L 21/563* (2013.01); *H01L 22/10* (2013.01); *G06F 2113/18* (2020.01)

(58) Field of Classification Search
CPC ............................ H01L 22/12; H01L 21/563
See application file for complete search history.

(56) References Cited

U.S. PATENT DOCUMENTS

| 8,008,122 B1 * | 8/2011 | Gaynes | H01L 24/81 257/738 |
| 2016/0133485 A1 * | 5/2016 | Benjamin | H01L 22/20 118/712 |
| 2018/0076184 A1 * | 3/2018 | Chen | H01L 23/49816 |

* cited by examiner

*Primary Examiner* — Allen L Parker
*Assistant Examiner* — Gustavo G Ramallo
(74) *Attorney, Agent, or Firm* — Muncy, Geissler, Olds & Lowe, P.C.

(57) ABSTRACT

The present disclosure provides a method of measuring a plurality of voids in an underfill material of an underfill package. The method includes operations of obtaining a welding angle profile of the underfill package; obtaining a simulated void profile of the underfill package according to the welding angle profile; determining a plurality of high-risk void regions according to the simulated void profile; simulating, according to a selected pressure and a selected temperature of the underfill material, a first high-risk void region of the plurality of high-risk void regions to generate an updated void profile; and determining whether the updated void profile meets a void requirement of the underfill package.

12 Claims, 11 Drawing Sheets

METHOD OF MEASURING VOIDS IN UNDERFILL PACKAGE

CROSS-REFERENCE TO RELATED APPLICATIONS

This application claims the benefit of previously-filed provisional application with application No. 63/277,101, filed Jul. 29, 2021, which is incorporated by reference in its entirety.

TECHNICAL FIELD

The present disclosure relates to a measurement method, and more particularly, to a method of measuring the voids in an underfill package.

DISCUSSION OF THE BACKGROUND

In an underfill process, due to a non-uniform flow pattern of an underfill material, voids may exist in the underfill material. The voids can affect properties of a flip-chip underfill package. When a heterogeneous bump distribution is presented in the package, the non-uniform flow pattern of the underfill material becomes more severe.

The voids may affect electrical and mechanical characteristics of the flip-chip underfill package. In particular, when the void is presented beside the bump, the void strongly affects the mechanical and electrical characteristics of the bump as well as product lifespan.

When determining whether a fill-chip underfill package meets requirements, dimensions and quantity of the voids are taken into consideration. Alternatively stated, the dimensions and the quantity of the voids are two key factors of a yield rate of the flip-chip underfill package. Therefore, information associated with the voids in the flip-chip underfill package is important in the underfill process.

This Discussion of the Background section is provided for background information only. The statements in this Discussion of the Background are not an admission that the subject matter disclosed in this section constitutes prior art to the present disclosure, and no part of this Discussion of the Background section may be used as an admission that any part of this application, including this Discussion of the Background section, constitutes prior art to the present disclosure.

SUMMARY

One aspect of the present disclosure provides a method of measuring a plurality of voids in an underfill material of an underfill package. The method includes operations of obtaining a welding angle profile of the underfill package; obtaining a simulated void profile of the underfill package according to the welding angle profile; determining a plurality of high-risk void regions according to the simulated void profile; simulating, according to a selected pressure and a selected temperature of the underfill material, a first high-risk void region of the plurality of high-risk void regions to generate an updated void profile; and determining whether the updated void profile meets a void requirement of the underfill package.

In some embodiments, the method further includes operations of: when the updated void profile meets the void requirement, injecting the underfill material; and performing a pressure-curing procedure on the underfill material to form the underfill package.

In some embodiments, the pressure-curing procedure is performed according to the selected pressure and the selected temperature.

In some embodiments, the method further includes an operation of: when the updated void profile does not meet the void requirement, modifying the selected pressure and the selected temperature of the underfill material to perform the operation of simulating the first high-risk void region of the plurality of high-risk void regions to generate the updated void profile again.

In some embodiments, the method further includes an operation of: simulating, according to the selected pressure and the selected temperature of the underfill material, a second high-risk void region of the plurality of high-risk void regions to update the updated void profile.

In some embodiments, the operation of obtaining the simulated void profile of the underfill package according to the welding angle profile includes operations of: obtaining an area fraction profile according to the welding angle profile, wherein the area fraction profile represents a fraction profile of a cavity of the underfill package occupied by the voids; and obtaining the simulated void profile according to the area fraction profile.

In some embodiments, the operation of obtaining the simulated void profile according to the area fraction profile includes operations of calculating an area of the plurality of voids according to the area fraction profile; obtaining an equivalent radius of the plurality of voids according to the area of the plurality of voids; determining a plurality of center positions of the plurality of voids; and obtaining the simulated void profile according to the equivalent radiuses and the plurality of center positions.

In some embodiments, the method further includes an operation of displaying the simulated void profile.

In some embodiments, the operation of determining the plurality of high-risk void regions according to the simulated void profile includes operations of selecting a plurality of high-risk voids from the plurality of voids according to the simulated void profile; and determining a plurality of regions comprising the plurality of high-risk voids to be the plurality of high-risk void regions.

In some embodiments, each of a plurality of radiuses of the plurality of high-risk voids is greater than a predetermined radius of a void requirement of the underfill package In some embodiments, the welding angle profile represents a behavior of the underfill material flowing through a cavity of the underfill package.

In some embodiments, the welding angle profile indicates an angle profile of two adjacent wave fronts of the underfill material while the underfill material is flowing.

The foregoing has outlined rather broadly the features and technical advantages of the present disclosure in order that the detailed description of the disclosure that follows may be better understood. Additional features and advantages of the disclosure will be described hereinafter, and form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

A more complete understanding of the present disclosure may be derived by referring to the detailed description and claims when considered in connection with the Figures, where like reference numbers refer to similar elements throughout the Figures.

DETAILED DESCRIPTION

Figure 1:
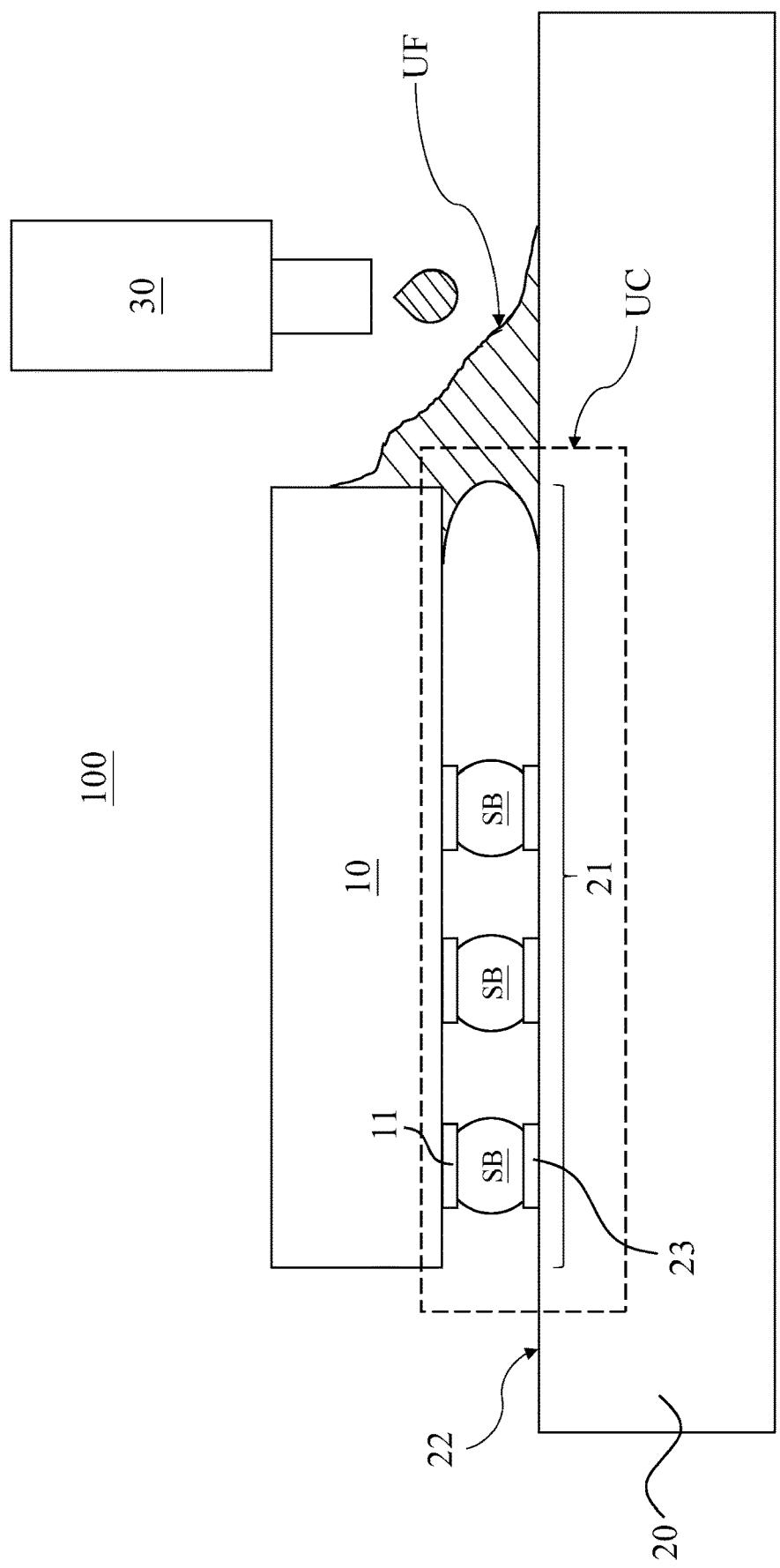
FIG. 1 is a schematic diagram of a molding system according to some embodiments of the present disclosure.

Embodiments, or examples, of the disclosure illustrated in the drawings are now described using specific language. It shall be understood that no limitation of the scope of the disclosure is hereby intended. Any alteration or modification of the described embodiments, and any further applications of principles described in this document, are to be considered as normally occurring to one of ordinary skill in the art to which the disclosure relates. Reference numerals may be repeated throughout the embodiments, but this does not necessarily mean that feature(s) of one embodiment apply to another embodiment, even if they share the same reference numeral.

It shall be understood that, although the terms first, second, third, etc. may be used herein to describe various elements, components, regions, layers or sections, these elements, components, regions, layers or sections are not limited by these terms. Rather, these terms are merely used to distinguish one element, component, region, layer or section from another element, component, region, layer or section. Thus, a first element, component, region, layer or section discussed below could be termed a second element, component, region, layer or section without departing from the teachings of the present inventive concept.

The terminology used herein is for the purpose of describing particular example embodiments only and is not intended to be limiting to the present inventive concept. As used herein, the singular forms "a," "an" and "the" are intended to include the plural forms as well, unless the context clearly indicates otherwise. It shall be further understood that the terms "comprises" and "comprising," when used in this specification, point out the presence of stated features, integers, steps, operations, elements, or components, but do not preclude the presence or addition of one or more other features, integers, steps, operations, elements, components, or groups thereof.

FIG. 1 is a schematic diagram of a molding system 100 according to some embodiments of the present disclosure. In an underfill process, a chip 10 is disposed on a substrate 20 within a bonding area 21. The substrate 20 includes a plurality of solder bumps SB disposed on a surface 22 of the substrate 20 within the bonding area 21, in which each solder bump SB is in contact with a bonding pad 23 and each bonding pad 23 is disposed on the surface 22. The chip 10 is in contact with the solder bumps SB via bonding pads 11. The solder bumps SB are configured to couple a circuit on the chip 10 to pins on the substrate 20 for functional or virtual connections. The bonding pads 23 and the bonding pads 11 are configured to provide better adhesion for the solder bumps SB. Next, a thermal process is performed to solder the chip 10 and the solder bumps SB together so as to form a shortest path from the chip 10 to the substrate 20. In some embodiments, the thermal process is a reflow soldering process.

After the thermal process, a cavity UC is formed and enclosed by the chip 10 and the substrate 20 as illustrated in FIG. 1. A dispenser 30 is configured to inject an underfill material UF to fill the cavity UC so as to encapsulate the solder bumps SB in the cavity UC.

The underfill material UF is configured to encapsulate the solder bumps SB to protect the solder bumps SB, and further configured to support the cavity UC so as to prevent the cavity UC from collapsing. In other words, the underfill material UF also provides physical support between the chip 10 and the substrate 20. In some embodiments, an underfill package UP is formed after the injecting of the underfill material if.

Figure 2:
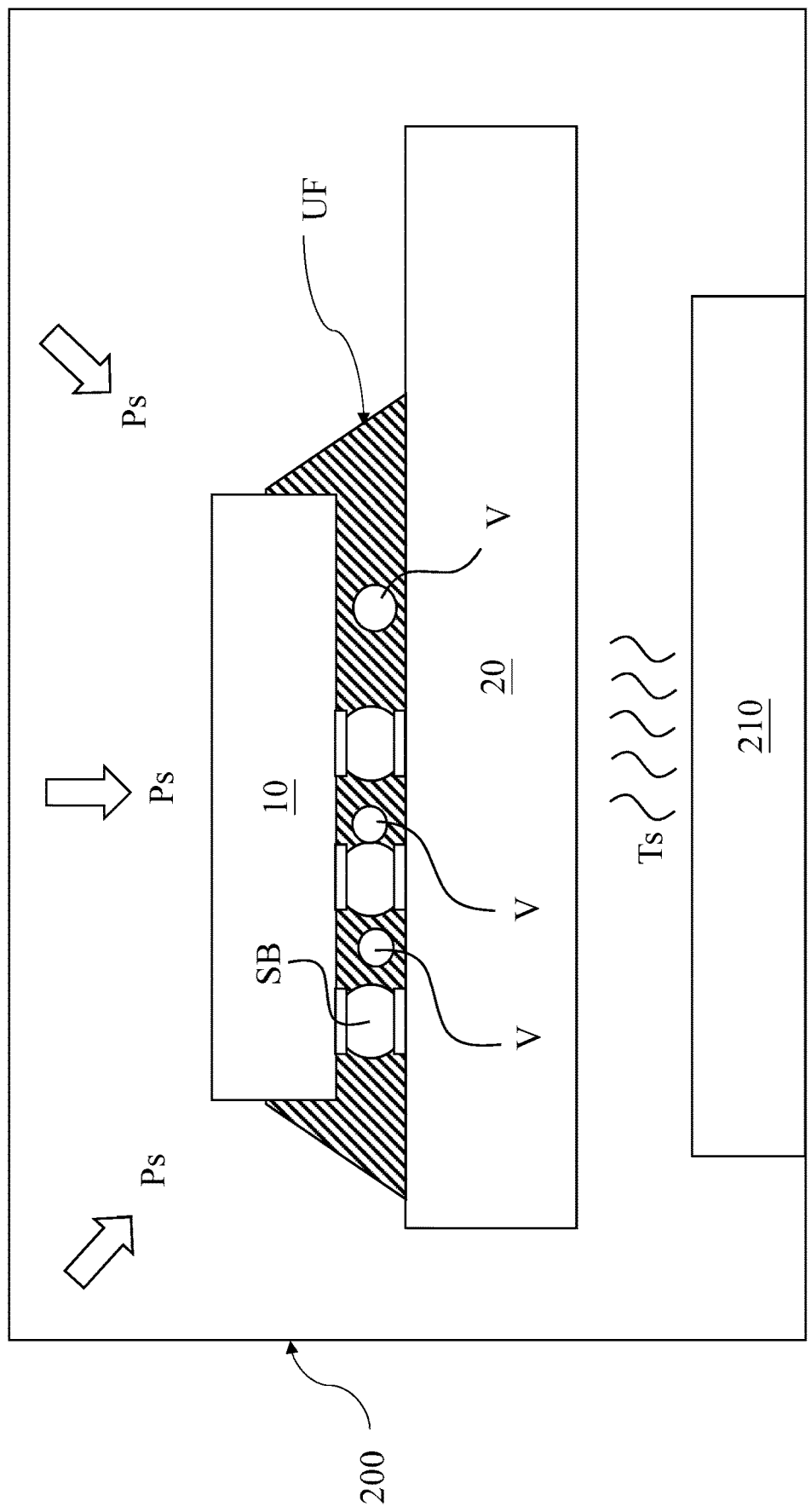
FIG. 2 is a schematic diagram of a pressure-curing oven according to some embodiments of the present disclosure.

Reference is made to FIG. 2. In some embodiments, voids V are formed in the underfill material UF. The voids V are empty space in the underfill material LF, thus, portions of the underfill material UF that contain the voids V have lower strength.

In some embodiments, the voids V are in contact with the solder bumps SB. Therefore, at least a portion of surfaces of the solder bumps SB are not covered by the underfill material UF, which deteriorates electrical and mechanical characteristics of the solder bumps SB. In other words, the solder bumps SB that contact the voids V have poorer electrical and mechanical characteristics than the solder bumps SB that do not contact the voids V.

In order to prevent the voids V from affecting the characteristics of the solder bumps SB and the underfill material UF, a pressure-curing procedure is performed on the underfill material UP to alleviate the effects caused by the voids V. The chip 10 and the substrate 20 are transferred to a pressure-curing oven 200. The pressure-curing oven 200 applies a selected pressure Ps to the underfill material UF between the chip 10 and the substrate 20, and heats, via a heater 210, the underfill material UF at a selected temperature Ts. The voids V in the underfill material UF shrink during the pressure-curing procedure as shown in in FIG. 3. Alternatively stated, dimensions of the voids V are decreased after the pressure-curing procedure.

In some embodiments, when the voids V do not satisfy a void requirement RQ of the underfill package UP, the pressure-curing procedure needs to be performed. More particularly, when the dimensions of the voids V exceed an upper limit value, the pressure-curing procedure is performed to reduce the dimensions of the voids V so as to make the voids V meet the void requirement RQ.

Figure 3:
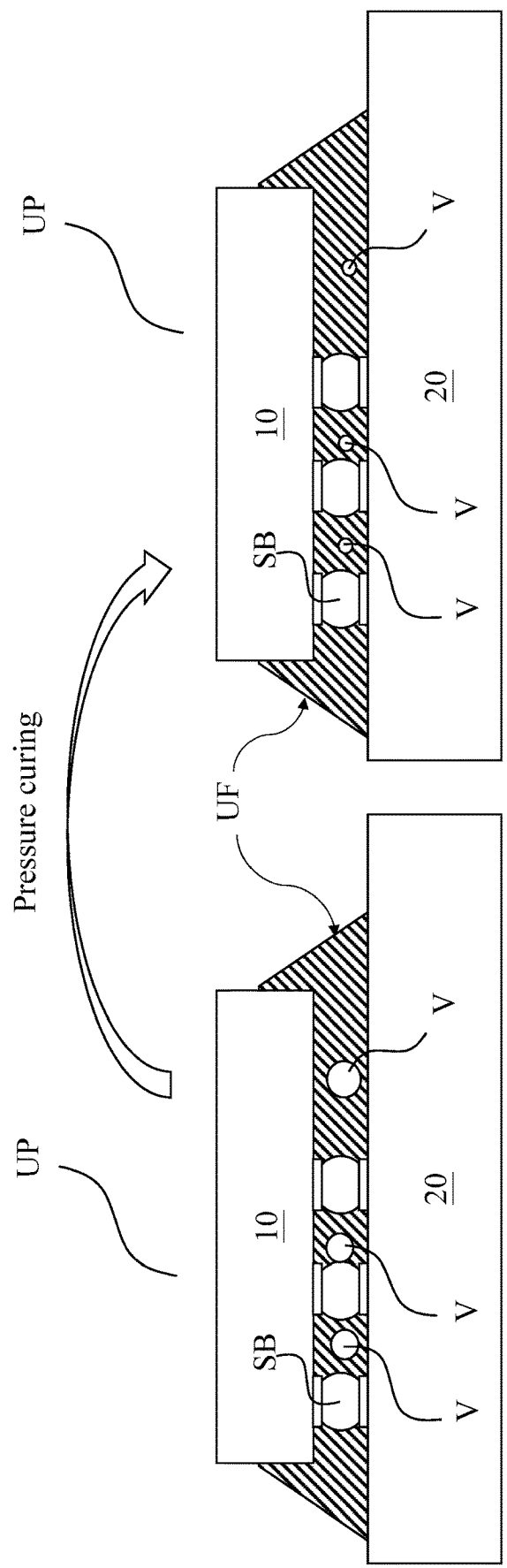
FIG. 3 is a schematic diagram of a pressure-curing procedure according to some embodiments of the present disclosure.
Figure 4A:
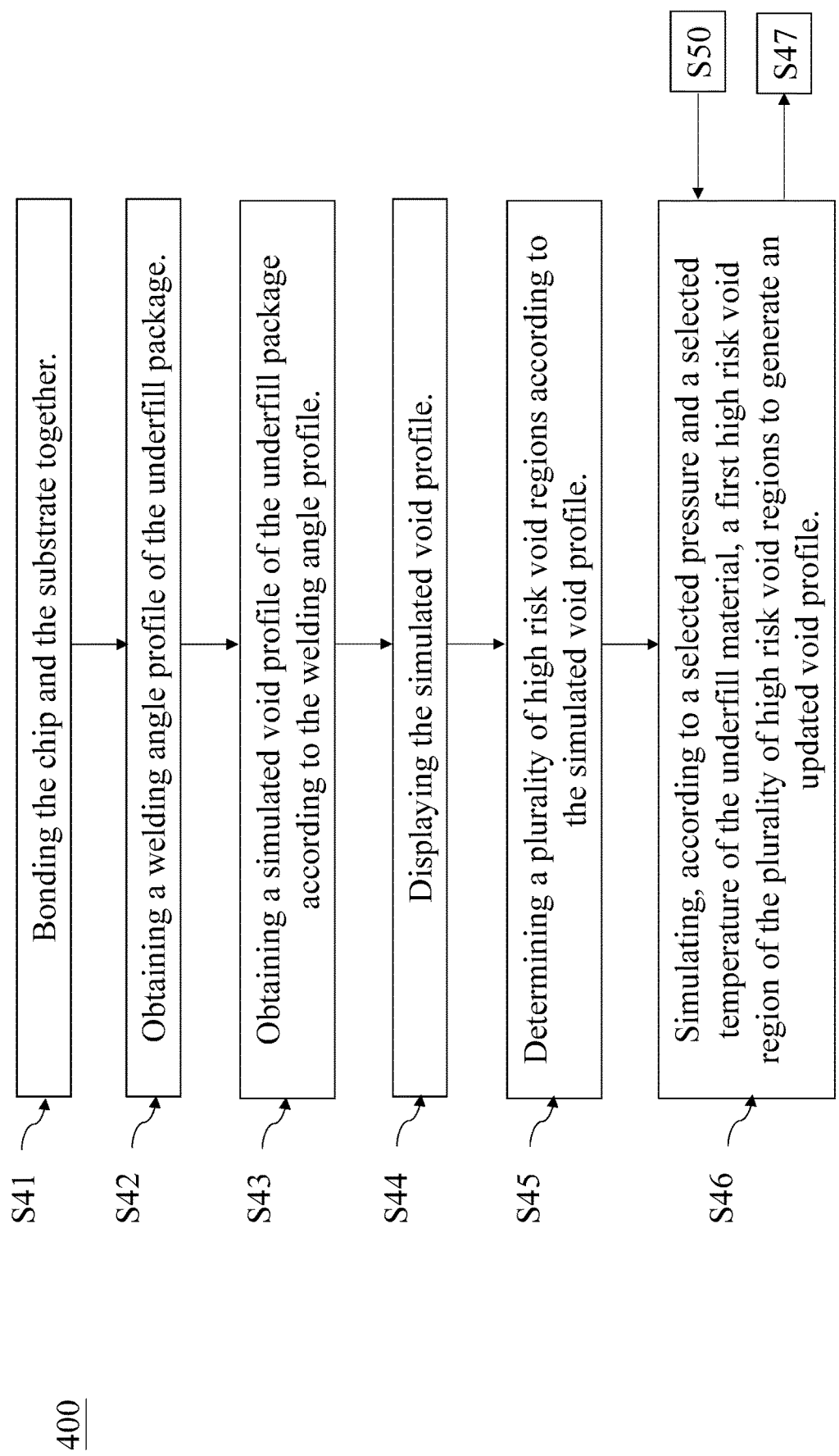
FIGS. 4A and 4B are a flowchart of a method according to some embodiments of the present disclosure.
Figure 4B:
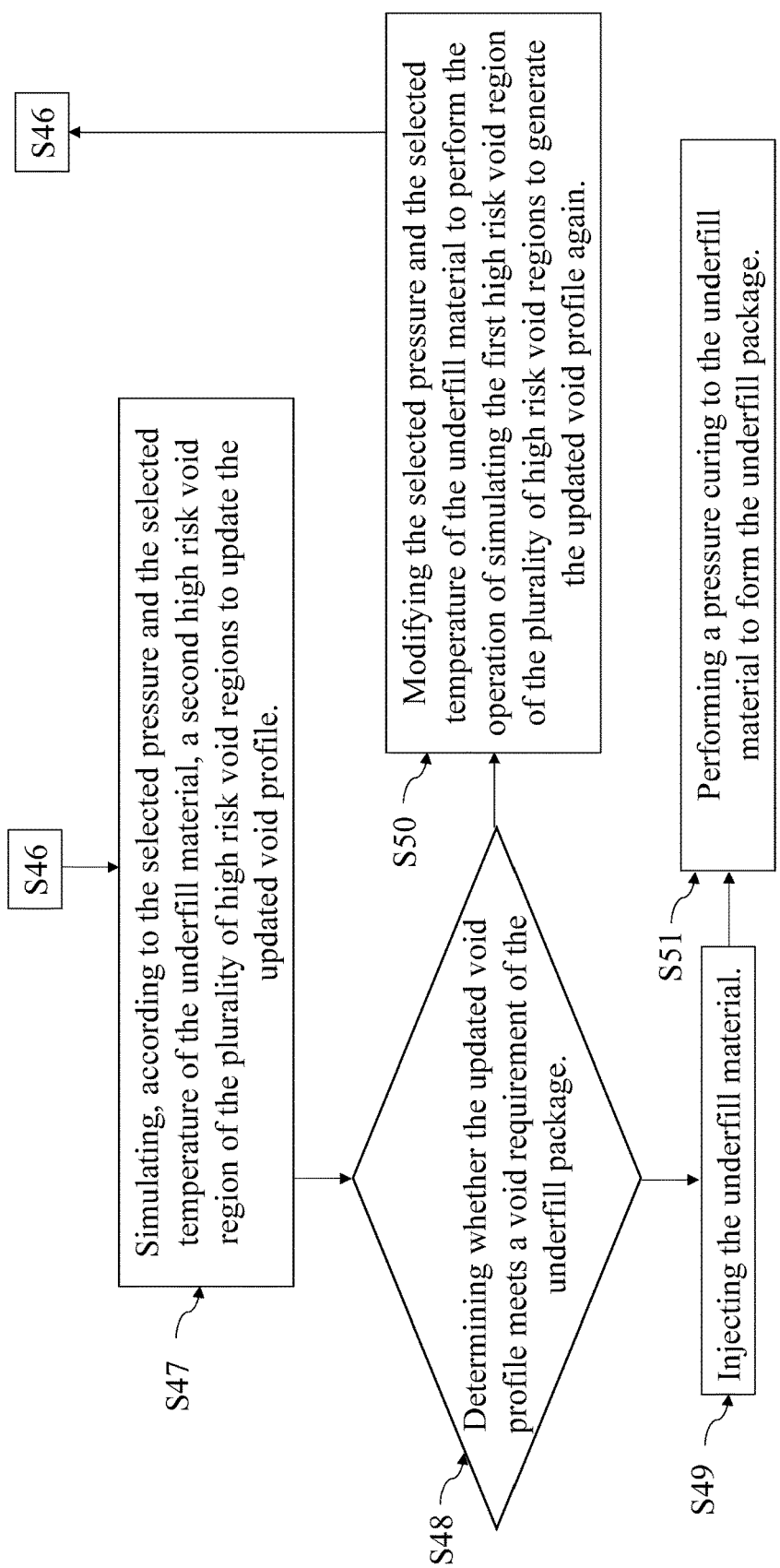

FIGS. 4A and 4B are a flowchart of a method 400 according to some embodiments of the present disclosure. The method 400 is configured to measure the voids V in the underfill material UF of the underfill package UP, and includes operations S41, S42, S43, S44, S45, S46, S47, S48, S49, S50 and S51. To facilitate understanding, the method 400 is describes with the reference numerals as shown in FIGS. 1 to 3.

In operation S41, the chip 10 and the substrate 20 are bonded together. The cavity UC with the solder bumps SB is formed.

Figure 5:
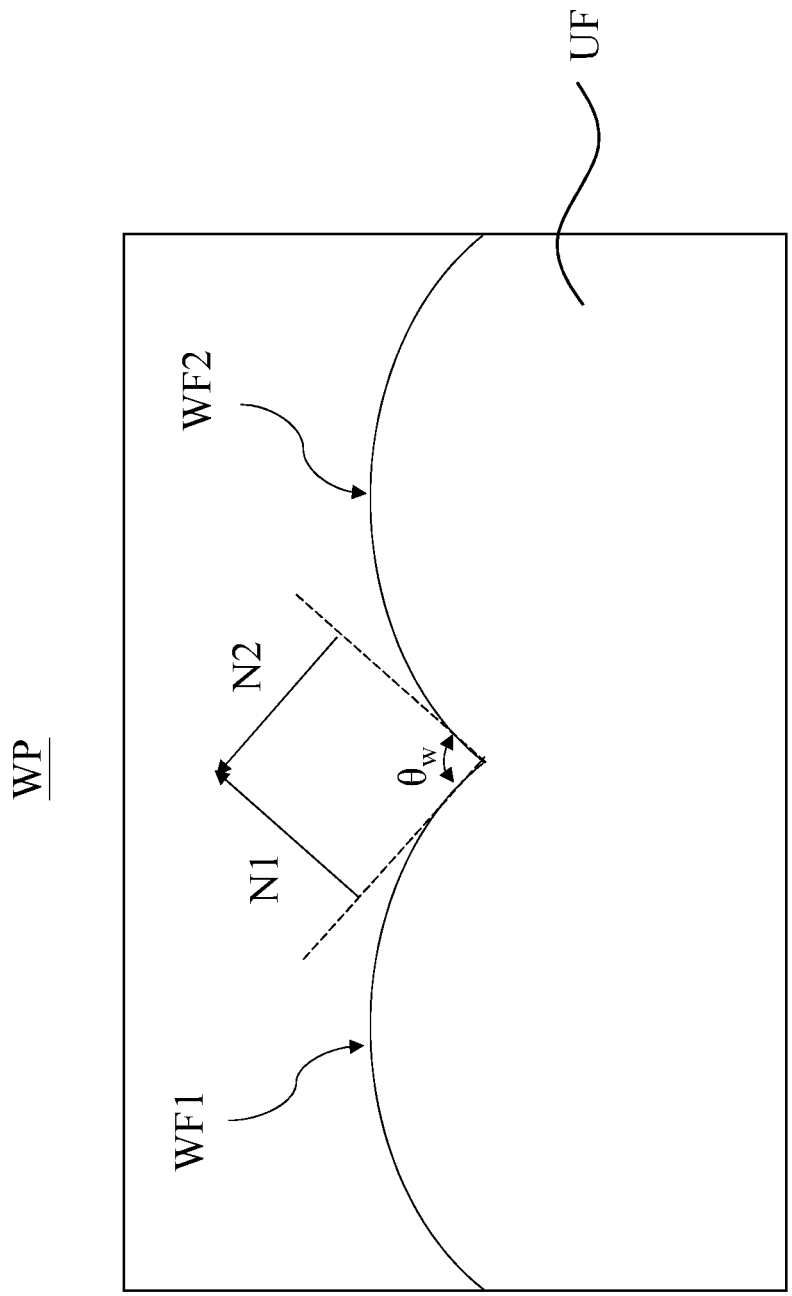
FIG. 5 is a schematic diagram of a welding angle profile according to some embodiments of the present disclosure.

In operation S42, the welding angle profile WP of the underfill package is obtained. FIG. 5 is a schematic diagram of the welding angle profile WP in a time node according to some embodiments of the present disclosure. The welding angle profile WP represents a behavior of the underfill material UF flowing through the cavity UC. The welding profile WP indicates positions of wave fronts of the underfill material UF in the cavity UC over time; therefore, the welding angle profile WP also indicates normal vectors of the wave fronts over time.

As illustrated in FIG. 5, a wave front WF1 and a wave front WF2 form a welding angle θw therebetween, and the welding angle θw is defined by a normal vector N1 of the wave front WF1 and a normal vector N2 of the wave front WF2.

In operation S43, a simulated void profile SVP (shown in FIG. 6) of the underfill package UP is obtained according to the welding angle profile WP. More particularly, the welding angle profile VP is transferred to the simulated void profile SVP. When the welding angle θw is less than a threshold value θc (shown in an equation (11)), the void V (viewed as a potential void V) has a high possibility of being formed. In some embodiments, the threshold value is 145 degrees. The simulated void profile SVP is configured to indicate positions of potential voids V, in which such positions represent locations where the welding angle θw is less than the threshold value. In other words, the simulated void profile SVP indicates the positions of the potential voids V in the cavity UC.

Figure 6:
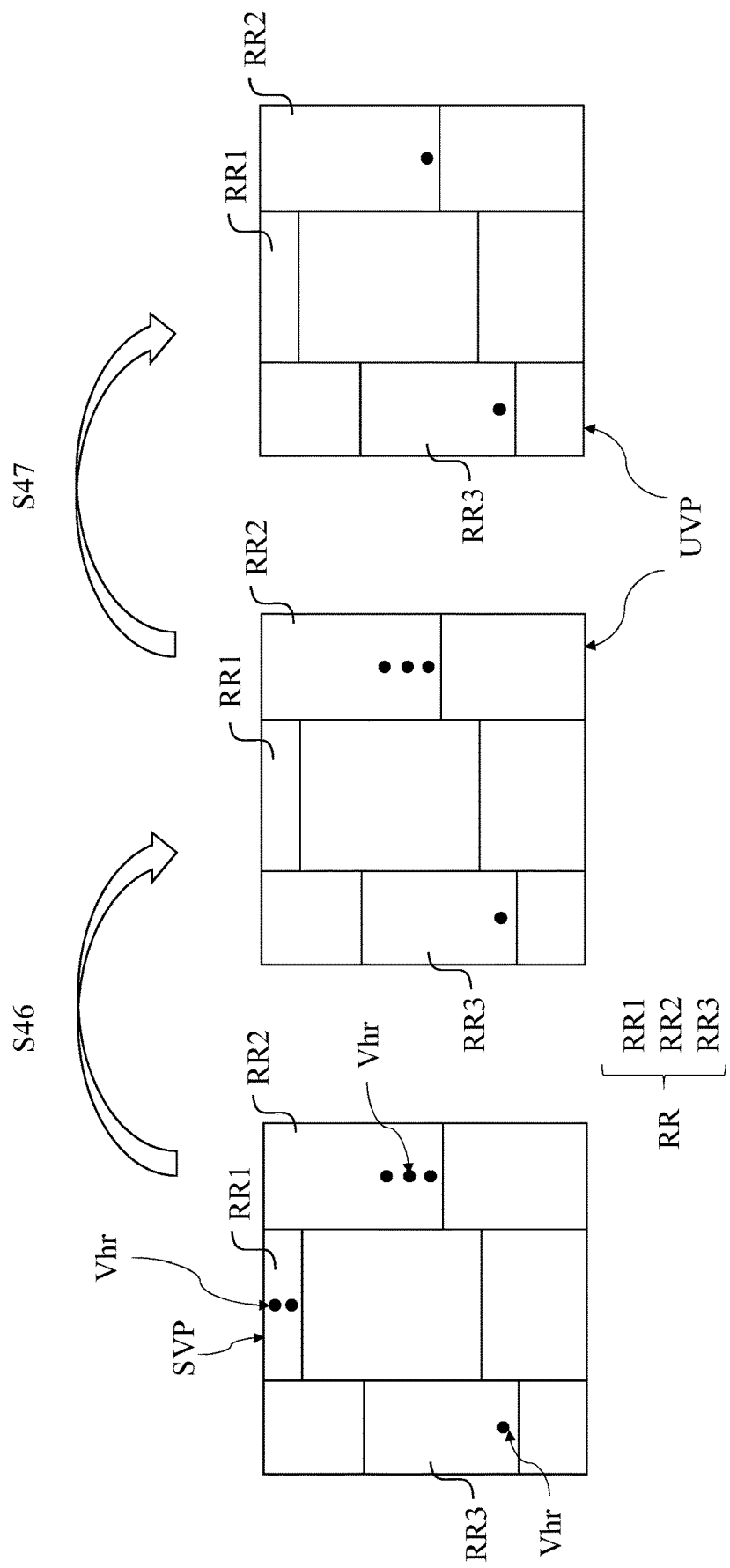
FIG. 6 is a schematic diagram of a simulated void profile and an updated void profile according to some embodiments of the present disclosure.

Please refer to FIG. 6. FIG. 6 is a schematic diagram of the simulated void profile SVP and an updated void profile UVP according to some embodiments of the present disclosure. The simulated void profile SVP shows several black dots, which represent the positions of the potential voids V. In operation S44, the simulated void profile SVP is displayed. In some embodiments, the simulated void profile SVP is displayed on a user interface, so that the simulated void profile SVP is able to be examined by an examination program of an operator.

In operation S45, high-risk void regions RR are determined according to the simulated void profile SVP. As illustrated in FIG. 6, the simulated void profile SVP can be divided into several regions, and the regions having the potential voids V (indicated by black dots) which have a radius greater than a predetermined radius $r_{th}$ of the void requirement of the underfill package are determined to be the high-risk void regions RR. In some embodiments, the potential voids V having the radius greater than the predetermined radius $r_{th}$ are also referred to as high-risk voids Vhr.

In operation S46, a first high-risk void region RR1 of the high-risk void regions KR is simulated to generate the updated void profile UVP according to the selected pressure Ps and the selected temperature Ts. Operation S46 is performed to forecast the result of the pressure-curing procedure. In order to reduce the dimensions of the potential voids V in the first high-risk void region RR1, the pressure-curing procedure is simulated at the selected pressure Ps and the selected temperature Ts. Comparing the simulated void profile SVP to the updated void profile UVP, the black dots in the first high-risk void region RR1 of the simulated void profile SVP are no longer present in the first high-risk void region RR1 of the updated void profile UVP, which means that the potential voids V in the first high-risk void region RR1 can be shrunk and/or eliminated after the pressure-curing procedure.

In operation S47, a second high-risk void region RR2 of the high-risk void regions R is simulated to update the updated void profile UVP according to the selected pressure Ps and the selected temperature Ts. Operation S47 is similar to operation S46; thus, details of operation S47 are not repeated herein.

In some embodiments, operations S46 and S47 are performed based on computational fluid dynamics (CFD) using a finite volume method (FVM). Specifically, a state of a void V can be expressed according to an area fraction profile $\alpha_v$ (will be described in operation S431 shown in FIG. 7), and the area fraction profile $\alpha_v$ can be measured according to governing equations. The governing equations can be expressed by following equations (1)-(8).

$$\frac{\partial \rho}{\partial t} + \nabla \cdot (\rho u) = 0. \tag{1}$$

$$\frac{\partial (\rho u)}{\partial t} + \nabla \cdot (\rho u \otimes u) = -\nabla p + \nabla \cdot \tau + f_b. \tag{2}$$

$$\tau = \mu\left(\nabla u + \nabla u^T - \frac{2}{3}I(\nabla \cdot u)\right). \tag{3}$$

$$\rho = \alpha_{UF}\rho_{UF} + \alpha_V\rho_V \tag{4}$$

$$\mu = \alpha_{UF}\mu_{UF} + \alpha_V\mu_V \tag{5}$$

$$\alpha_{UF} + \alpha_V = 1 \tag{6}$$

$$\rho_{UF} = \rho_{0,UF}\left(\frac{p - p_{0,UF}}{B} + 1\right)^{1/\gamma_{UF}}. \tag{7}$$

$$\rho_V = \rho_{0,V}\left(\frac{p}{p_{0,V}}\right)^{1/\gamma_V}. \tag{8}$$

ρ is the fluid density; u is a flow velocity; p is the pressure Ps; τ is the stress tensor; $f_b$ is a body force; μ is a viscosity; γ and B are material constants for the equation of state; t is time; subscripts UF and V Denote the underfill material and the void; and a subscript 0 denotes an initial reference state. a is the area fraction profile. Above equations are provided for illustrative purposes. Various suitable equations for the area fraction profile $\alpha_V$ are within the contemplated scope of the present disclosure.

Unless all of the high-risk void regions RR have been simulated according to the selected pressure Ps and the selected temperature Ts, the method 400 proceeds to operation S48.

In operation S48, it is determined whether the voids V in the updated void profile UVP meet the void requirement RQ of the underfill package UP. When the voids V in the updated void profile UVP meet the void requirement RQ, the method 400 proceeds to operation S49. When the voids V in the updated void profile UVP do not meet the void requirement RQ, the method 400 proceeds to operation S50.

In operation S49, the underfill material LF is injected into the cavity UC. In operation S51, the pressure-curing procedure is performed on the underfill material UF to modify the underfill package UP according to the selected pressure Ps and the selected temperature Ts. The underfill material UF in the underfill package UP has substantially the same profile as the updated void profile UVP.

In operation S50, when the voids V in the updated void profile UVP do not meet the void requirement RQ, the selected pressure Ps and the selected temperature Ts of the underfill material UF used in operation S46 are modified. After the selected pressure Ps and the selected temperature Ts are modified, the method 400 proceeds to operation S46 to simulate the first high-risk void region RR1 again according to the modified selected pressure Ps and the modified selected temperature Ts.

The method 400 in FIGS. 4A and 4B is provided for illustrative purposes. Other suitable operations and/or suitable performing sequences are within the contemplated scope of the present disclosure. For example, in various embodiments, operation S44 can be omitted. In alternative embodiments, operation S46 and operation S47 can be performed simultaneously.

Figure 7:
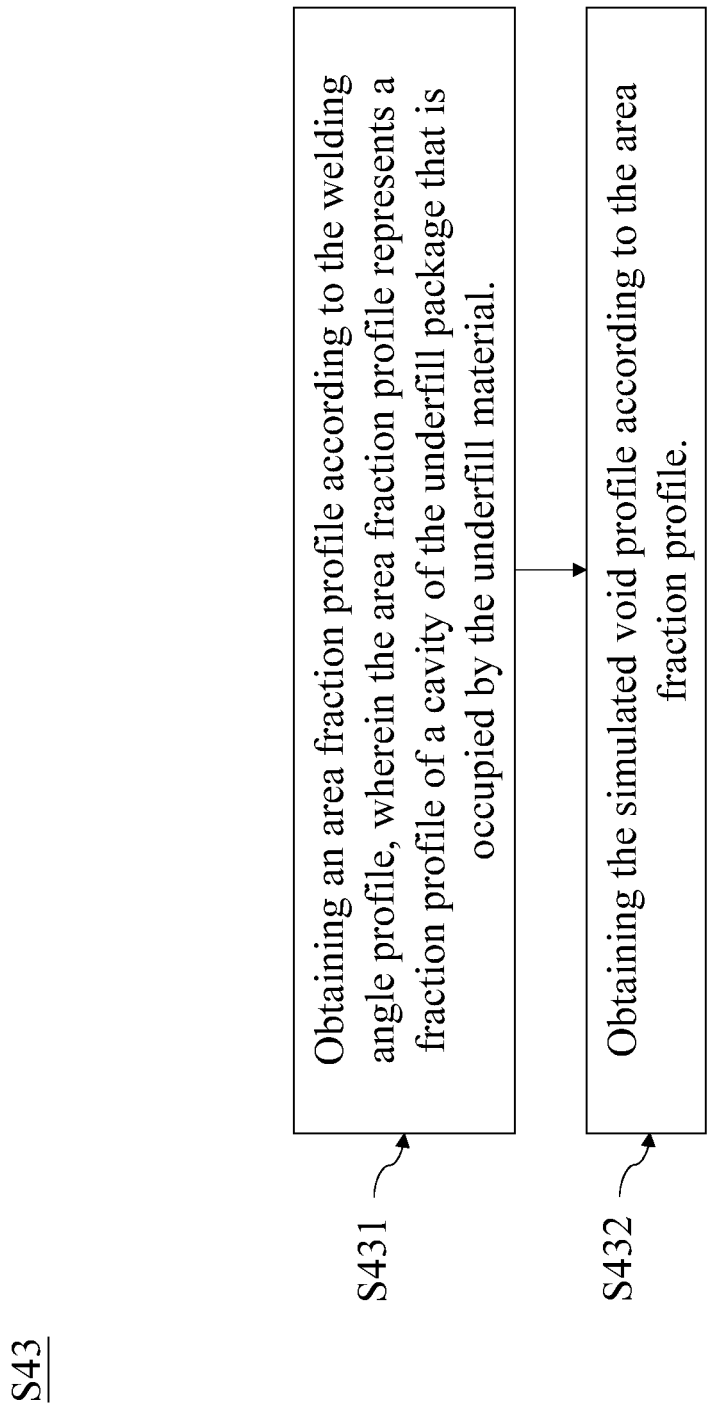
FIG. 7 is a flowchart of an operation in the method shown in FIGS. 4A and 45 according to some embodiments of the present disclosure.

Reference is made to FIG. 7. FIG. 7 is a flowchart of operation S43 of the method 400 according to some embodiments of the present disclosure. Operation S43 includes operations S431 and S432.

In operation S431, the area fraction profile $\alpha_v$ is obtained according to the welding angle profile WP. The area fraction profile $\alpha_v$ represents a fraction profile of the cavity UC when the cavity UC is occupied by the voids V. Alternatively stated, the area fraction profile $\alpha_v$ represents a local void area fraction profile. In some embodiments, each local area in the local void area fraction profile represents a computational element divided by a total area.

In some embodiments, the area fraction profile $\alpha_v$ is obtained from an equation (9).

$$\alpha_v = 1 - \frac{\theta w}{\theta c}. \tag{9}$$

$\theta w$ is the welding angle as illustrated in FIG. 5, and $\theta c$ is the threshold value.

Figure 8:
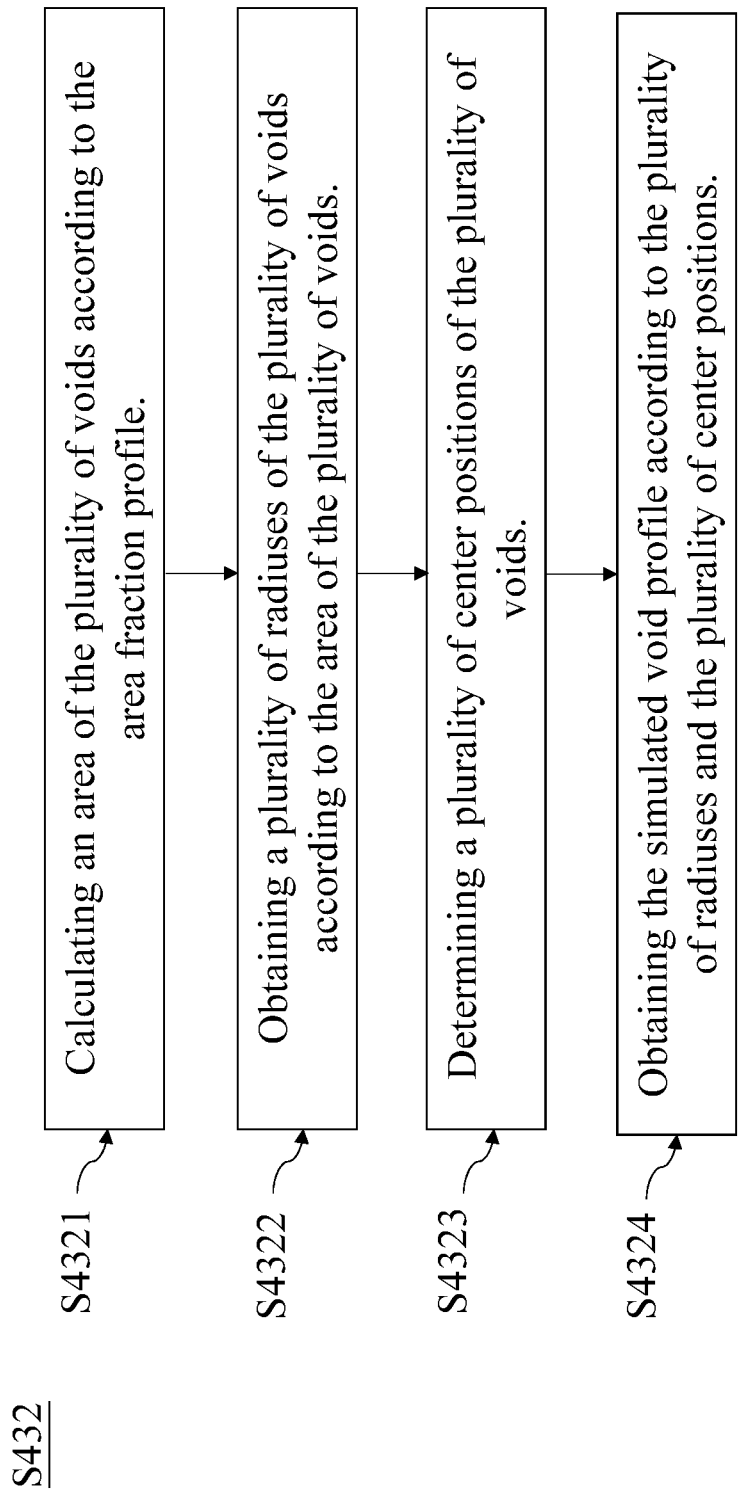
FIG. 8 is a flowchart of an operation in the method shown in FIGS. 4A and 4B according to some embodiments of the present disclosure.

In operation S432, the simulated void profile SVP is obtained according to the area fraction profile $\alpha_v$. In some embodiments, operation S432 includes operations S4321, S4322, S4323 and S4324 as illustrated in FIG. 8.

In operation S4321, the area $A_v$ of the void V (potential void) is calculated according to the area fraction profile $\alpha_v$. The area $A_v$ can be obtained from an equation (10).

$$A_v = \Sigma \alpha_v \times A \tag{10}.$$

Figure 9:
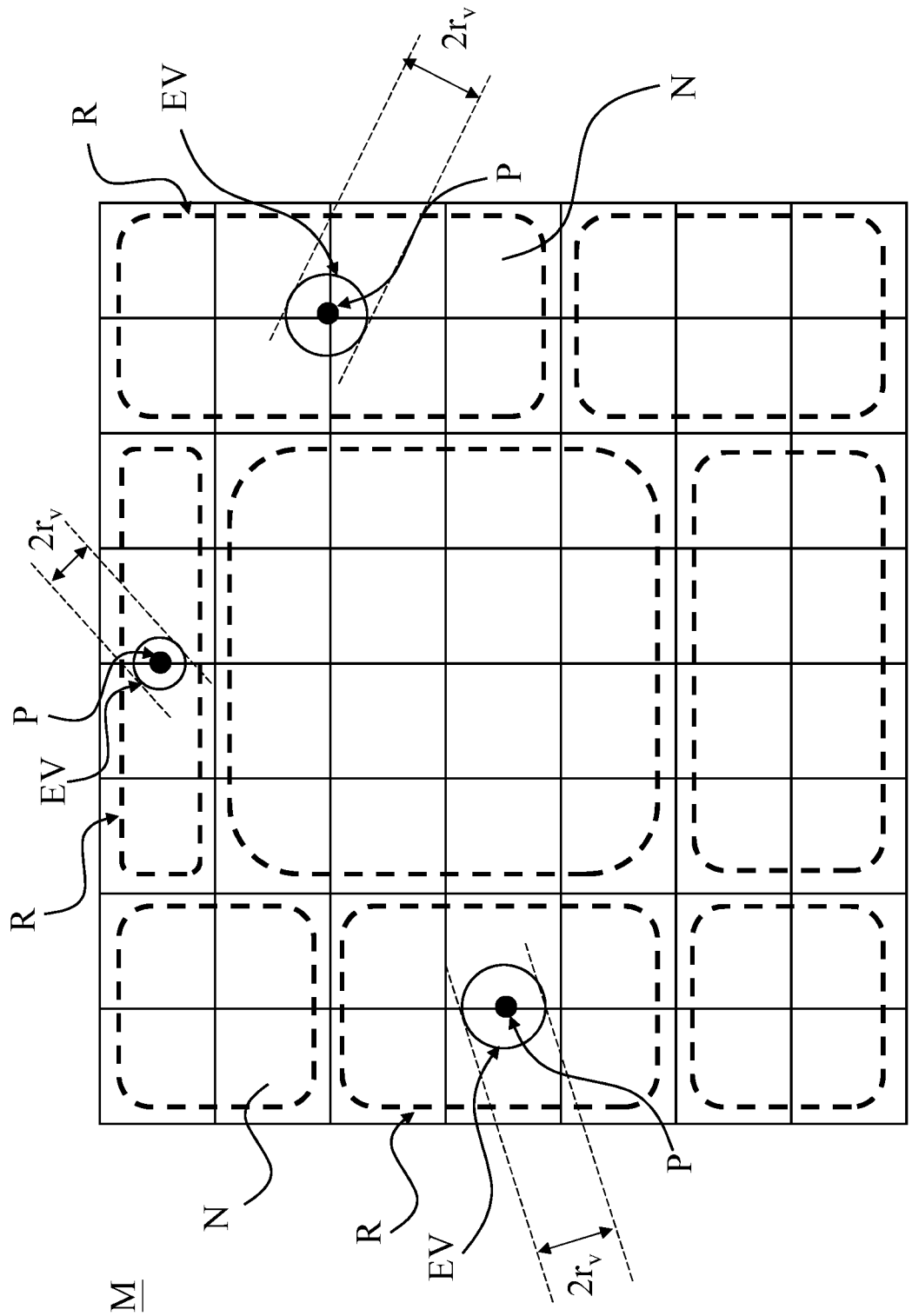
FIG. 9 is a schematic diagram of a simulated void profile according to other embodiments of the present disclosure.

Please also refer to FIG. 9. In some embodiments, a space of the cavity UC is described by a mesh M, which includes nodes N. The area fraction profile $\alpha_v$ in the equations (4) and (5) represents the area fraction at each of the nodes N. The area $A_v$ indicates an effective area occupied by the potential void V in a region R, and such region R corresponds to one of the high-risk void regions RR. A is an area of the node N.

In some embodiments, the mesh M further includes bump geometry therein. The bump geometry indicates dimensions of solder bumps SB in the cavity UC. In some embodiments, the bump geometry is reconstructed in the mesh M based on a detailed model. In such embodiments, the dimension and a position of each solder bump SB is described in the bump geometry. In other embodiments, the bump geometry is reconstructed in the mesh M based on an equivalent model. In such embodiments, a number of the solder bumps SB is determined based on an average density of the solder bumps SB. The dimensions of the solder bumps SB are determined according to the average density, and the solder bumps SB are randomly distributed.

In operation S4322, equivalent radiuses $r_v$ of the voids V are obtained according to the area $A_v$. The equivalent radius $r_v$ can be obtained from an equation (11). In some embodiments, a number of the voids V in a region R may greater than one. The equivalent radius $r_v$ represents an equivalent void EV, in which the equivalent void EV has an area equal to a total area of the voids V in the region R.

$$r_v = \sqrt{\frac{A_v}{\pi}}. \tag{11}$$

In operation S4323, center positions P of the equivalent voids EV are determined. In some embodiments, the center position P of each equivalent void EV is determined at the center of the corresponding region R as shown in FIG. 9.

In operation S4324, the simulated void profile SVP is obtained according to the radiuses $r_v$ and the center positions of the equivalent voids EV. In some embodiments, in operation S44, the simulated void profile SVP is displayed with the equivalent voids EV instead of the black dots shown in FIG. 6.

Figure 10:
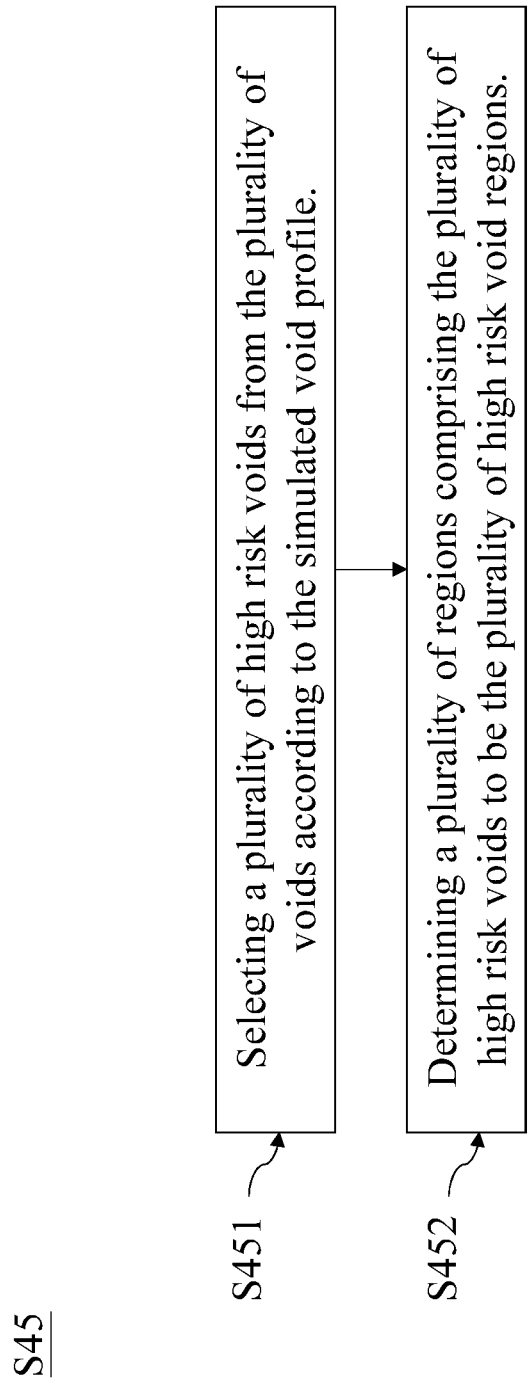
FIG. 10 is a flowchart of an operation in the method shown in FIGS. 4A and 4B according to some embodiments of the present disclosure.

Reference is made to FIG. 10. FIG. 10 is a flowchart of operation S45 of the method 400 according to some embodiments of the present disclosure. Operation S45 includes operations S451 and S452.

In operation S451, the high-risk voids Vhr are selected from the voids V (potential voids) according to the simulated void profile SVP. In other words, the simulated void profile SVP, obtained according to the welding angle profile WP, is configured to indicate the high-risk voids Vhr. In some embodiments, the voids V that have radiuses greater than the predetermined radius $r_{th}$ of the void requirement QR are determined to be the high-risk voids Vhr, and are selected for the following operation.

In operation S452, the regions R that include the high-risk voids Vhr are determined to be the high-risk void regions KR.

In some approaches, the underfill material UF is injected without simulating the pressure-curing procedure. Therefore, the result of the pressure-curing procedure is known only when the pressure-curing procedure is completed. When the result of the pressure-curing procedure does not satisfy the void requirement RQ, the injection of the underfill material UF needs to be repeated with a new chip 10 and a new substrate 20. Consequently, in such embodiments, the cost (including time and materials) for the underfill package UP is high.

Compared to the above approaches, the present disclosure provides the embodiments of the method 400 to measure the dimensions of the voids V before the injecting of the underfill material UF. More specifically, the method 400 applies the welding angle profile WP to determine the positions of the voids V (and/or the equivalent voids EV) so as to measure the dimensions of the voids V. Once the dimensions of the voids V meet the void requirement RQ, the underfill material UF is injected into the cavity UC, and the pressure-curing procedure is performed on the underfill material UF.

One aspect of the present disclosure provides a method of measuring a plurality of voids in an underfill material of an underfill package. The method includes operations of: obtaining a welding angle profile of the underfill package; obtaining a simulated void profile of the underfill package according to the welding angle profile; determining a plurality of high-risk void regions according to the simulated void profile; simulating using CFD, according to a selected pressure and a selected temperature of the underfill material, a first high-risk void region of the plurality of high-risk void regions to generate an updated void profile; and determining whether the updated void profile meets a void requirement of the underfill package.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods or steps, presently existing or later to be developed, that perform substantially the same function or achieve substantially the same result as the corresponding embodiments described herein, may be utilized according to the present disclosure. Accordingly, the appended claims are intended to include within their scope such processes, machines, manufacture, compositions of matter, means, methods and steps.

What is claimed is:

1. A method of measuring a plurality of voids in an underfill material of an underfill package, comprising:
    obtaining a welding angle profile of the underfill package;
    obtaining a simulated void profile of the underfill package according to the welding angle profile;
    determining a plurality of high-risk void regions according to the simulated void profile;
    prior to injecting the underfill material to a cavity of the underfill package, simulating, according to a selected pressure and a selected temperature of the underfill material, a first high-risk void region of the plurality of high-risk void regions to generate an updated void profile; and
    determining whether the updated void profile meets a void requirement of the underfill package, wherein the void requirement comprises a predetermined radius, wherein when equivalent radiuses of the plurality of voids simulated by the updated void profile are less than the predetermined radius, the updated void profile meets the void requirement; and
    injecting the underfill material when the updated void profile meets the void requirement.

2. The method of claim 1, further comprising: performing a pressure-curing procedure on the underfill material to form the underfill package.

3. The method of claim 2, wherein the pressure-curing procedure is performed according to the selected pressure and the selected temperature.

4. The method of claim 1, further comprising:
    when the updated void profile does not meet the void requirement, modifying the selected pressure and the selected temperature of the underfill material to perform the operation of simulating the first high-risk void region of the plurality of high-risk void regions to generate the updated void profile again.

5. The method of claim 1, further comprising:
    simulating, according to the selected pressure and the selected temperature of the underfill material, a second high-risk void region of the plurality of high-risk void regions to update the updated void profile.

6. The method of claim 1, wherein the operation of obtaining the simulated void profile of the underfill package according to the welding angle profile comprises:
    obtaining an area fraction profile according to the welding angle profile, wherein the area fraction profile represents a fraction profile of a cavity of the underfill package that is occupied by the voids; and
    obtaining the simulated void profile according to the area fraction profile.

7. The method of claim 6, wherein the operation of obtaining the simulated void profile according to the area fraction profile comprises:
    calculating an area of the plurality of voids according to the area fraction profile;
    obtaining equivalent radiuses from each of the plurality of voids according to the area of the plurality of voids;
    determining a plurality of center positions of the plurality of voids; and
    obtaining the simulated void profile according to the equivalent radiuses and the plurality of center positions.

8. The method of claim 7, further comprising:
    displaying the simulated void profile.

9. The method of claim 1, wherein the operation of determining the plurality of high-risk void regions according to the simulated void profile comprises:
    selecting a plurality of high-risk voids from the plurality of voids according to the simulated void profile; and
    determining a plurality of regions comprising the plurality of high-risk voids to be the plurality of high-risk void regions.

10. The method of claim 9, wherein each of a plurality of radiuses of the plurality of high-risk voids is greater than the predetermined radius of the void requirement of the underfill package.

11. The method of claim 1, wherein the welding angle profile represents a behavior of the underfill material flowing through a cavity of the underfill package.

12. The method of claim 11, wherein the welding angle profile indicates an angle profile of two adjacent wave fronts of the underfill material while the underfill material is flowing.

* * * * *